United States Patent [19]

Moorhouse

[11] 4,107,655

[45] Aug. 15, 1978

[54] MECHANICAL CODE FOR OPERATED DEVICE FOR ACCESS TO CODED ELECTRICAL CIRCUITS

[76] Inventor: John H. Moorhouse, Clear Lake, Minn. 55319

[21] Appl. No.: 758,059

[22] Filed: Jan. 10, 1977

[51] Int. Cl.² .......... H04Q 3/00

[52] U.S. Cl. .......... 340/149 R; 340/543; 340/149 A; 340/164 R

[58] Field of Search .......... 340/274 C, 149 A, 164 R, 340/149 R; 70/277, 278

[56] References Cited

U.S. PATENT DOCUMENTS

| | | | |
|---|---|---|---|
| 2,831,129 | 4/1958 | Penney | 70/277 |
| 3,165,599 | 1/1965 | Clay | 340/274 C |
| 3,639,906 | 2/1972 | Tritsch | 70/277 X |
| 3,657,496 | 4/1972 | Davidson | 70/278 |
| 3,663,774 | 5/1972 | Feder | 340/274 C |
| 3,854,120 | 12/1974 | Matto | 340/274 C |

*Primary Examiner*—Harold I. Pitts
*Attorney, Agent, or Firm*—Leo Gregory

[57] ABSTRACT

A code operated device which includes a multiplicity of coded electrical circuits to which it provides access and is mechanically operated by coded keys which respectively correspond to each of the circuits for access to a corresponding circuit. This device includes cylindrical tumblers having their edges coded by an arrangement of reflective spots, the edge coding being arranged by the relative rotation of each tumbler by the coded keys, the edge coding is read by a reflective spot readout unit and the code read is transmitted to an addressing box which in turn matches the code read to a corresponding circuit. The circuits representing the various combinations of the code used are in a conventional arrangement in circuit with said readout units by the use of a printed circuit board. With the use of binary coded decimals and with the use of four tumblers there are possible a total of 9,999 different code arrangements for a like number of circuits and the device is capable of receiving a like number of coded keys. Each addition of a tumbler increases the available number of code combinations by a multiple of ten.

6 Claims, 14 Drawing Figures

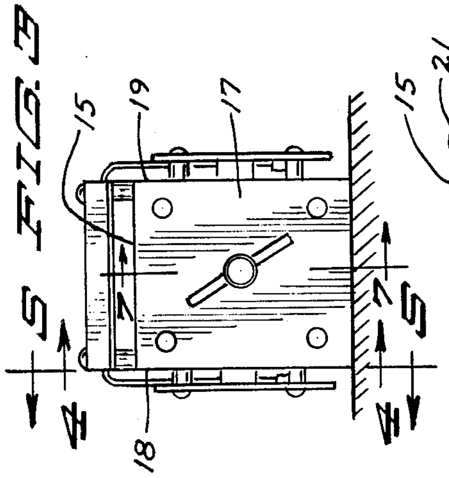
FIG. 3
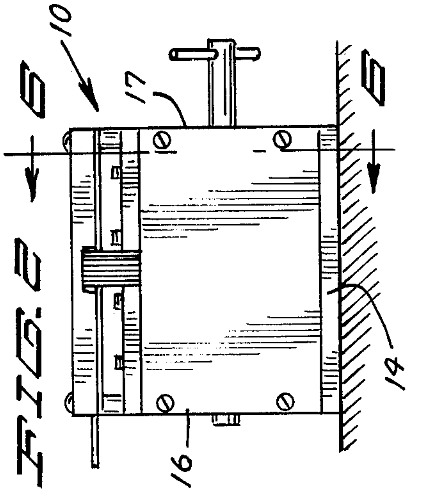
FIG. 2
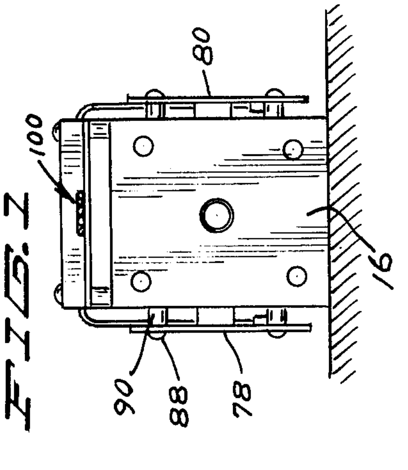
FIG. 1
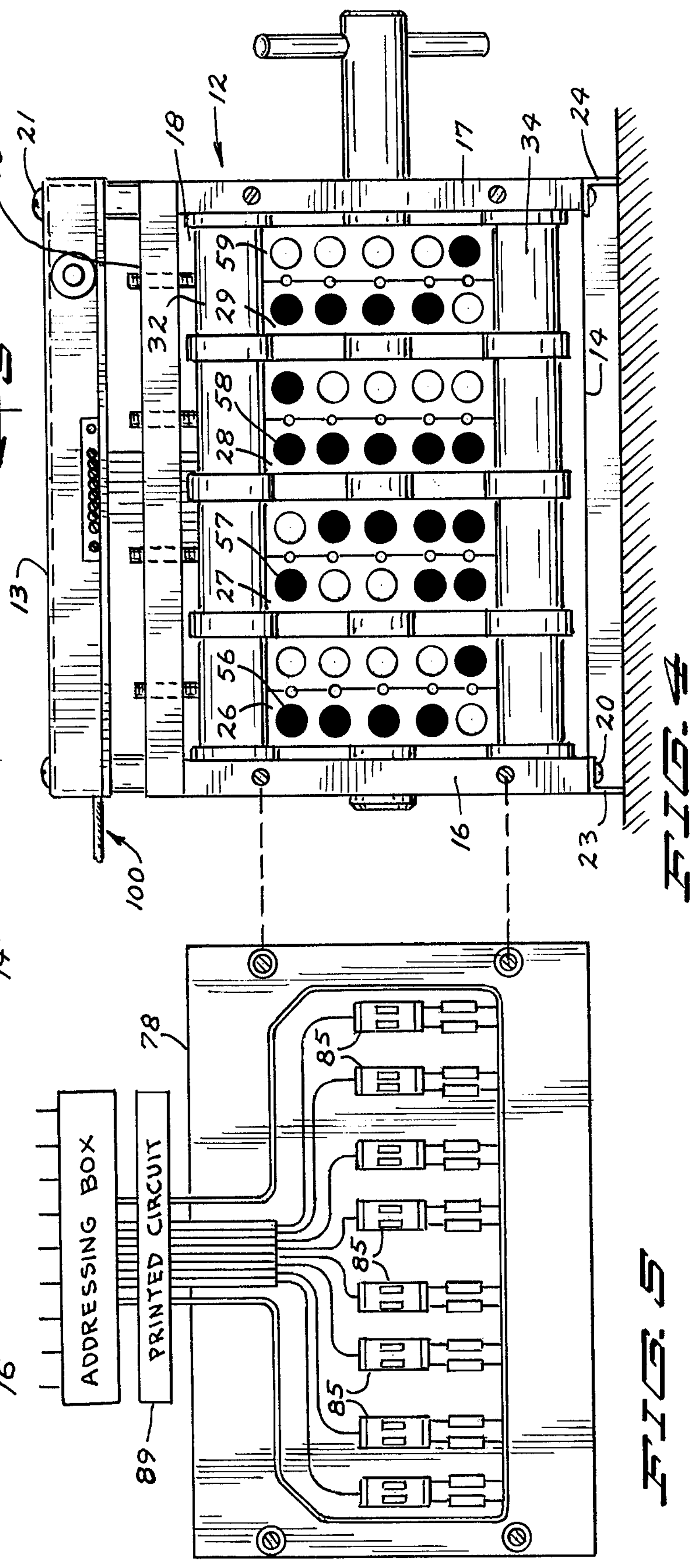
FIG. 4
FIG. 5

MECHANICAL CODE FOR OPERATED DEVICE FOR ACCESS TO CODED ELECTRICAL CIRCUITS

BACKGROUND OF THE INVENTION

1. Field of the Invention

This invention relates to a lock structure having mechanical key operated coded tumblers having access to remote corresponding electrical circuits.

2. Description of the Prior Art

The prior art is known to have mechanical electrically operated lock structures but is not known to have a lock structure capable of receiving a large number of coded keys with each of such keys adapted to rotate a plurality of cylindrical tumblers in accordance with the code borne by the respective keys for a non-mechanical actuation of a sensing apparatus to actuate a remote corresponding circuit.

SUMMARY OF THE INVENTION

This invention relates to what is basically a mechanically operated device adapted to receive a large number of keys each being constructed to represent a code designation. The device includes a plurality of tumblers adapted to have various relative arranged positions in accordance with the code arrangement of key used and said device has in connection therewith a large number of electrical circuits with each circuit corresponding to a coded key and an interface means sensing the code arrangement of the tumblers provides access and matches each code arrangement to a corresponding circuit.

A significant and unusual convenience of the device herein is present in its construction which permits it to receive an unusually large number of coded keys for coded access to corresponding circuits, the circuits may be designed to perform various functions such as having access to specific computer programs, providing access to secured quarters or performing such a task as energizing the equipment computing the data resulting from a customer operated gasoline pump, with reference to each coded key used.

It is an object of this invention to provide a device arranged and adapted to receive a large number of coded keys and through its operation provide access to electric circuits respectively corresponding to the keys used.

It is another object of this invention to have a simply constructed control means to provide a secured selective access to a large number of electrical circuits.

It is more specifically an object of this invention to provide a device in connection with a multiplicity of electrical circuits, said device being arranged and constructed to selectively provide a secured coded access to said circuits, said device comprising a plurality of cylindrical tumblers each having independent rotation and each bearing code indicia on its edge portion, each of said circuits in connection with said device having a particular code identification and a key is provided with a coded configuration to rotate said tumblers and the code identification indicated by said tumblers is sensed by an interface means which in turn provides access to an matches said identification to a corresponding circuit.

It is more generally an object of this invention to provide a mechanical type of device comprising a plurality of cylindrical tumblers having their respective edge portions bearing a code indicia whereby the relative arrangement of said tumblers by a coded key provides a code designation on an edge portion of said tumblers, means are carried by said device to sense said code designation, said code designation being made up of reflective spots and said code sensing means comprising a reflective spot readout unit, said unit transmitting the code designation sensed to an addressing box which provides access and matches the code designated with a corresponding electrical circuit, the matching results from a prearrangement of said circuits.

These and other objects and advantages of the invention herein will be set forth in the following description made in connection with the accompanying drawings in which like reference characters refer to similar parts throughout the several views.

BRIEF DESCRIPTION OF THE DRAWINGS

FIG. 1 is a view in elevation of one end of the device herein;

FIG. 2 is a view in side elevation;

FIG. 3 is a view in elevation of the other end of the device herein;

FIG. 4 is a view in elevation taken on line 4—4 of FIG. 3 as indicated;

FIG. 5 is a view in elevation taken on line 5—5 of FIG. 3 as indicated;

DESCRIPTION OF A PREFERRED EMBODIMENT

Figure 6:
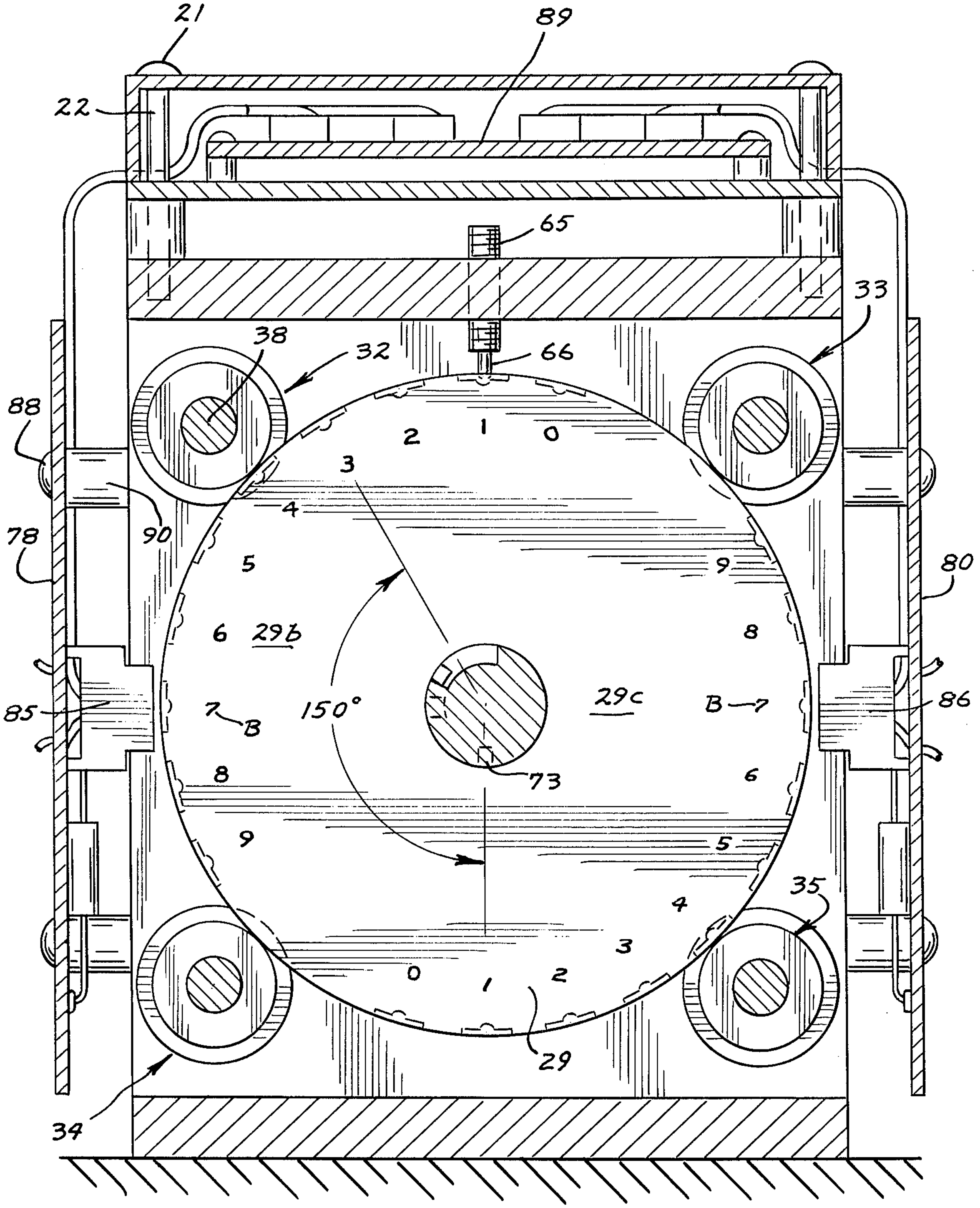
FIG. 6 is a view on an enlarged scale in vertical section taken on line 6—6 of FIG. 2 as indicated.

Referring to the drawings, the device 10 herein comprises means 12 which in the instant embodiment is here presented as a housing substantially parallelepiped in form having a bottom wall 14, a top wall 15 and end walls 16 and 17 disposed between the respective end portions of said top wall and bottom wall. Overlying said top wall is a top cover plate 13. Said bottom wall is secured by bolts 20 and said cover plate and top wall are secured by bolts 21 with spacer members 22 therebetween. Said bolts 20 also secure to the outer side of said bottom wall depending elongated angled plate members 23 and 24 forming supporting members. Said housing has open sides 18 and 19.

Disposed within said housing between said end walls in axial alignment are a plurality of cylindrical tumbler members here shown to be four in number and the same are indicated by the reference numerals 26, 27, 28 and 29 and respectively have aligned bores **26*a* – 29*a*. Said end walls 16 and 17 respectively have openings or bores 16a and 17a aligned with said bores of said tumblers. Said bores 26a - 29a and 16a and 17a form a keyway 30**.

Said tumblers are supported and held in spaced relation by roller type bearing structures or members indicated generally by the reference numerals 32, 33, 34 and 35 spaced about the periphery thereof.

In the embodiment presented, the bearing member 33 will be described as representative of the other bearing members 32, 34 and 35.

Extending through said bearing member 33 is a rod 38 having end portions 39 here secured as by being threaded into in the end walls 16 and 17, and is positioned in the adjacent upper corner portion of the housing 12 and carried thereon are the freely rotatable bearings 40 in the form of cylindrical rollers which taken together comprise said bearing member 33 and the same are separated by spacing members 45 and have end spacing members 46, each spacing member having sufficient diameter to extend somewhat inwardly of or between the adjacent edge portions of said tumblers. Thus it is seen that said tumblers are supported by and between said bearing members and have independent rotation. Said rollers and spacing members may be made as of a suitable plastic, rubber, or composition material.

Said tumbler members or tumblers have on their respective edge portions code indicia 55. The codes which may be used may take on various forms of which one will be described here.

In the instant embodiment, for purpose of illustration and not for the purpose of limitation, the code herein presented is a reflective spot binary code with the respective edge portions of said tumblers having disposed thereabout the reflective code spots 56 - 59. The code spots comprise white spots 56a - 59a and dark spots 56b - 59b. The white spots have a total reflection for the value of binary 1 and the dark spots have a low reflection for the value of binary 0, as will be further described. Said spots or binary signals taken with the sensing means to be described act as "off - on" switches.

Said spots are arranged in transversely aligned pairs spaced about the edge portions of said tumblers, there being 20 pairs spaced about each tumbler to provide the binary code.

As will be further described, the tumblers may be rotated not to exceed a maximum of 180° whereby there are corresponding pairs of said spots on each diametrically opposed half portion of each of said tumblers with two corresponding pairs of said spots forming each digit of said code. With the use of four tumblers, the code indicated herein comprises four digits.

Each of the tumblers 26 - 29 has a central circumferential groove 60 thereabout and in transverse alignment therein with each pair of said spots is a detent 62.

Figure 7:
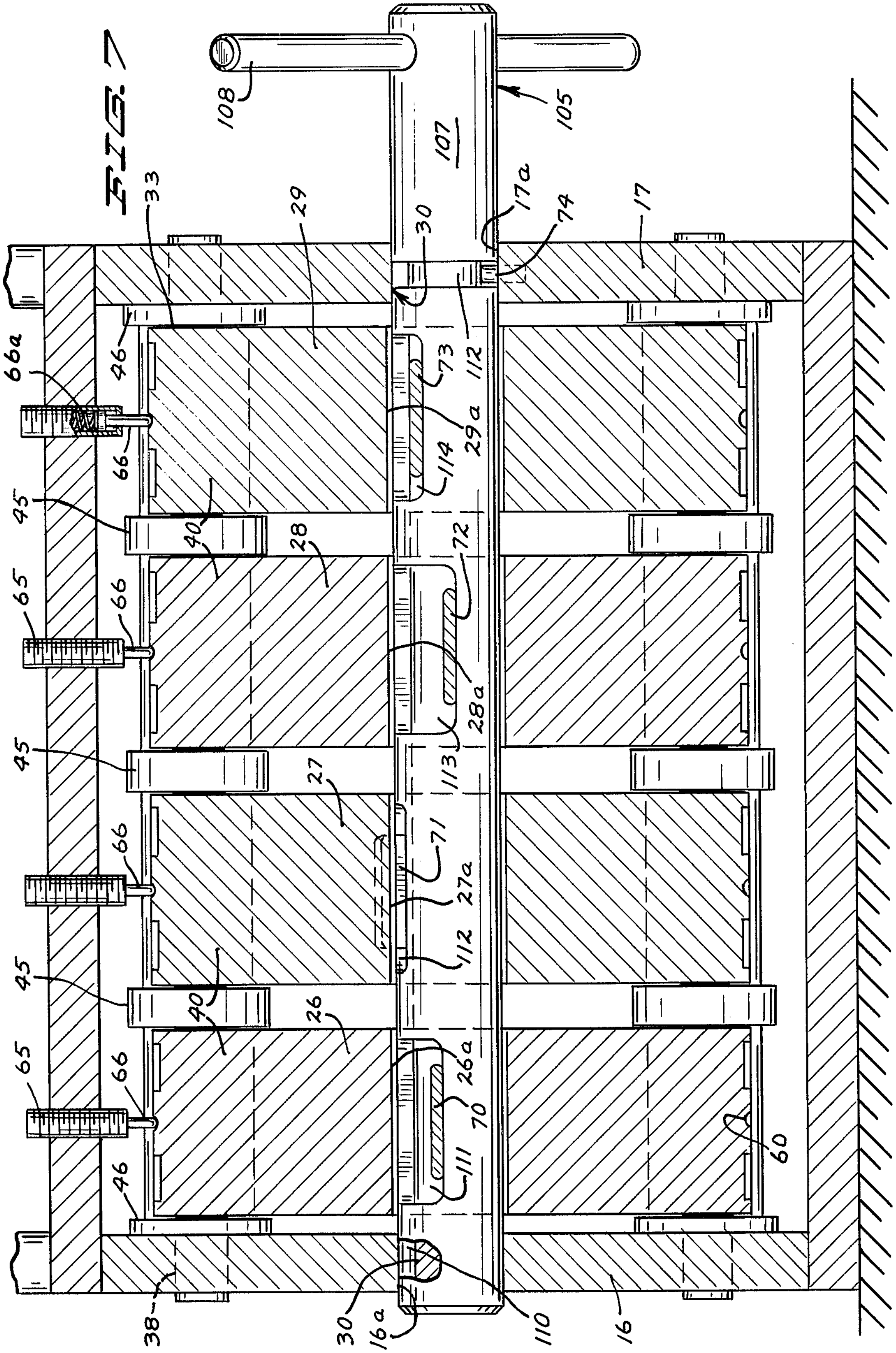
FIG. 7 is a view on an enlarged scale taken on line 7—7 of FIG. 3 as indicated.

Disposed through the bottom and top walls 14 and 15 of the housing 12 in opposed vertical alignment are spring loaded retainer pins 65 threaded through the respective bottom and top walls and having their yielding tips 66, as indicated at 66a in FIG. 7, removably seat into said detents 62 as said detents come into alignment therewith and said pins act to position said tumblers.

Figure 8:
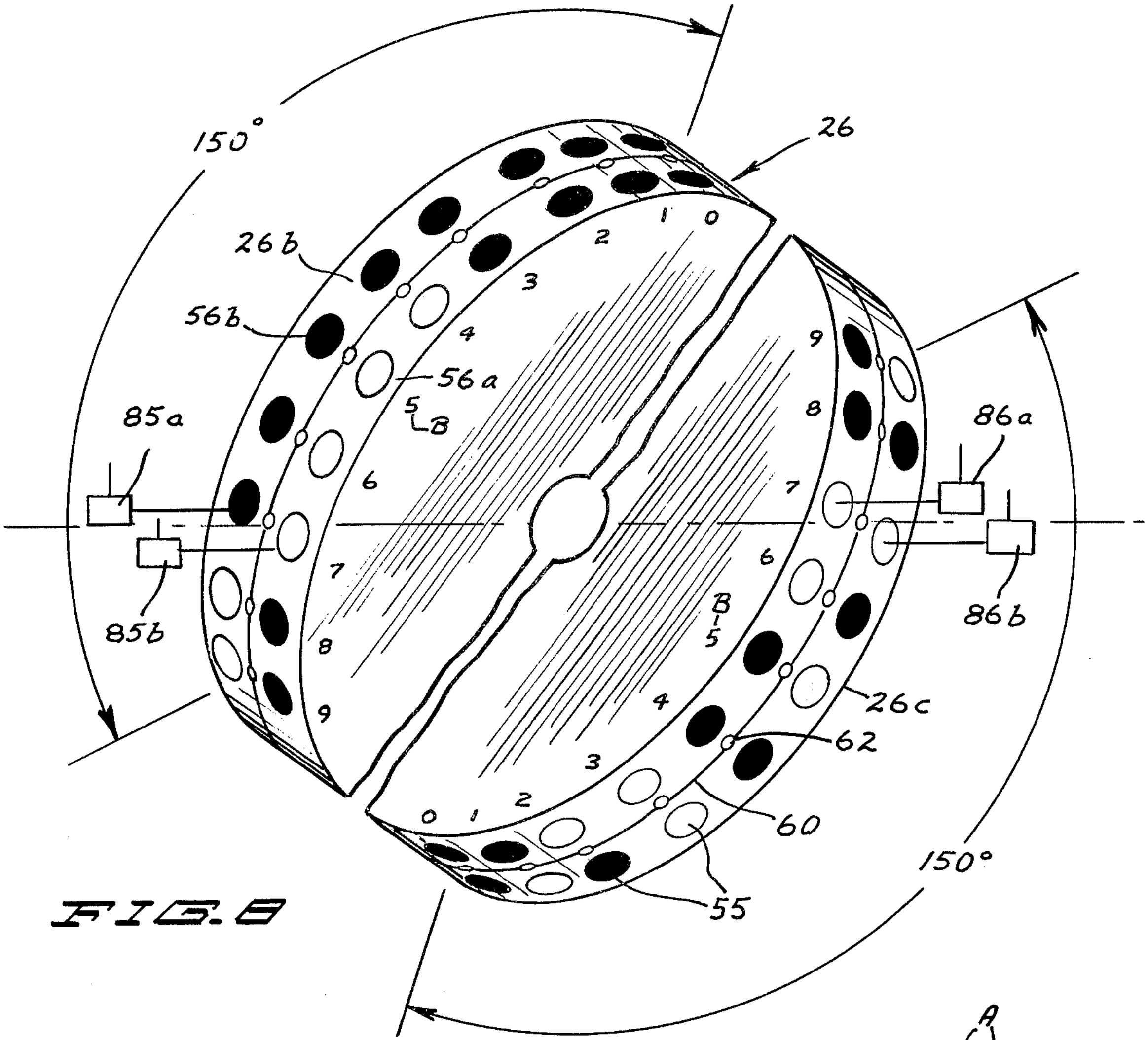
FIG. 8 is an exploded broken view in perspective of a detail of structure on an enlarged scale.
Figure 9:
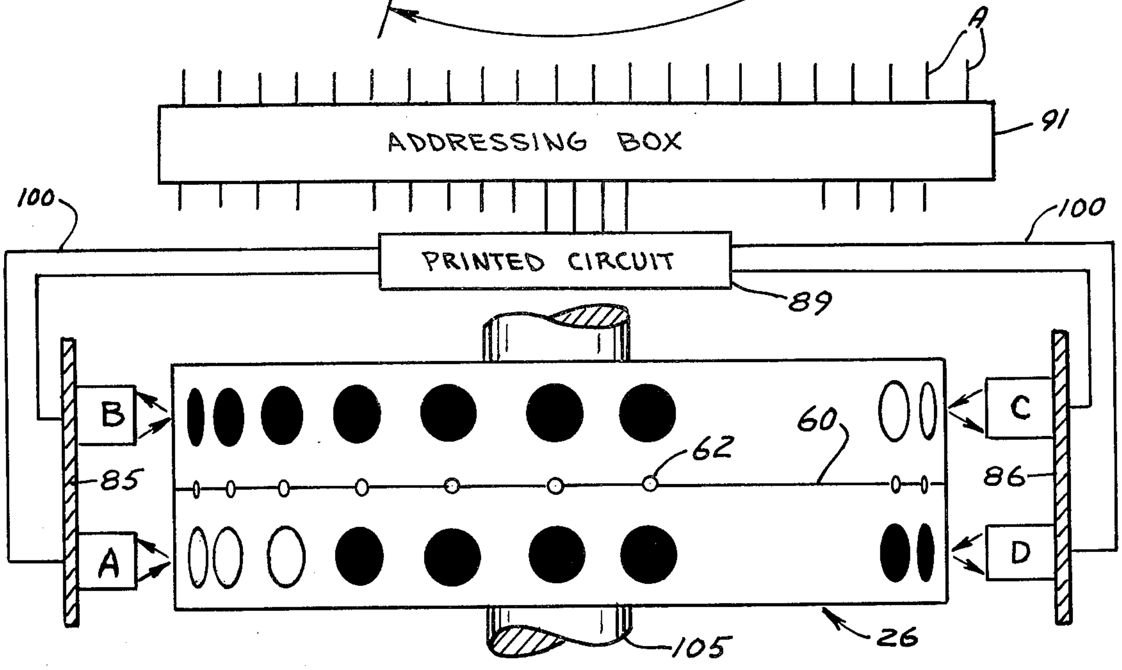
FIG. 9 is a fragmentary view partially diagrammatic and partially schematic showing a circuit arrangement.

Referring to FIGS. 8 and 9, the respective diametrically opposed halves of 26b and 26c of the tumbler 26 are shown bearing on their respective edge portions the indicia of binary coded decimals with the corresponding pairs of spots on said diametrically opposed halves of said tumbler representing in code the digits 0 - 9. The corresponding pairs of said spots are indicated by like digits as indicated by reference character B. The tumbler 26 as described is representative of the other tumblers.

Thus the edge coding of the tumblers in combination as described make up the binary code here used and as here presented. Said tumblers have their coded edge portions respectively disposed at the open sides 18 and 19 of said housing.

Projecting into each of the bores of said tumblers 26 - 29 are narrow elongated projections 70 - 73 and projecting into said bore 16a is a pin like projection 74. The projection 74 is stationary and serves as a stop member to limit the rotation of an operating member as will be described. Said pins are in alignment in said keyway when said device is in initial operating position to have an operating member inserted.

Figure 10:
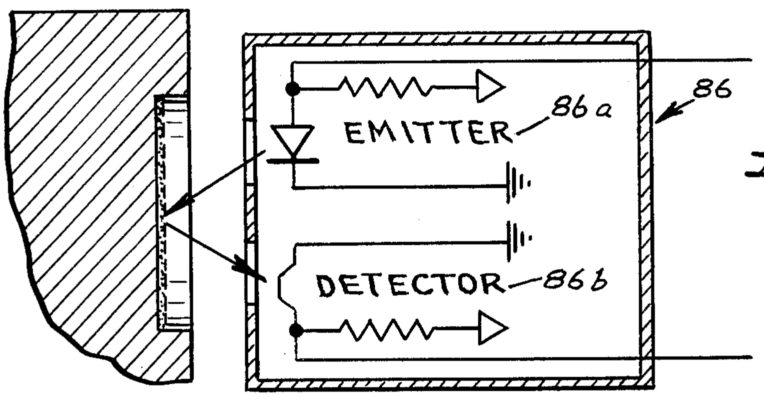
FIG. 10 is a schematic fragmentary view of an element of structure.
Figure 11:
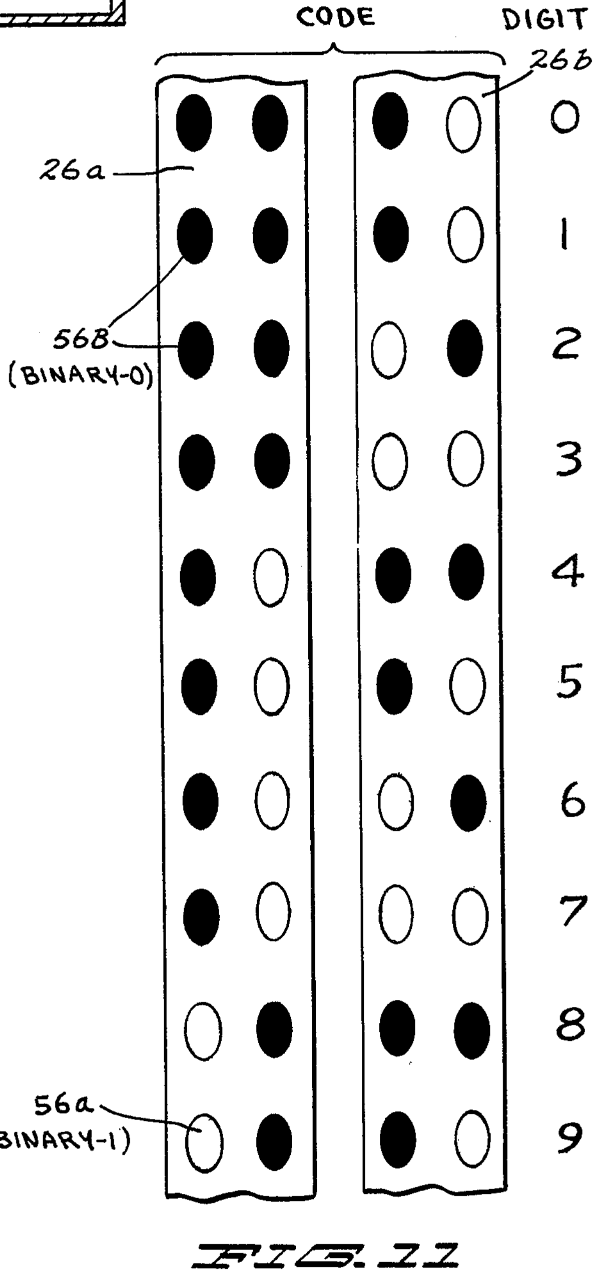
FIG. 11 is a fragmentary diagrammatic illustration of the code indicia used herein representing the edge portion of a tumbler.

Overlying the open sides 18 and 19 respectively of said housing are side wall members 78 and 80 carrying the circuitry herein and respectively included in said circuitry are reflective sensors 85 and 86 in opposed horizontal alignment at each of said open sides in connection with the edge portions of each of the tumblers and as indicated here, they are of a type in conventional use such as an MCA7 reflective sensor. Said reflective sensors provide both a light source of infra-red from their respective emitters 85a and 86a directed at an aligned row of said spots 56 - 59 and sense the reflection from said spots by their detectors 85b and 86b as illustrated in FIG. 10. A pair of reflective sensors is provided for each horizontal pair of said code spots of each of the tumblers coming into alignment or register with said sensors.

As previously described, there is a total reflection of white spots which is sensed as the value of binary 1 and there is a low reflection from the dark spots which is sensed as a value of binary 0.

Said side wall members as shown are secured by bolts 88 threaded into the adjacent edges of the end walls 16 and 17 and carried on said bolts at the inner sides of said side wall members 78 and 80 are spacers 90 to provide a spaced relationship between said reflective sensors and the adjacent edge portions of said tumblers.

In connection with said side wall members 78 and 80 is a printed circuit board 89 providing the circuits for connecting the sensors 85 and 86 with an addressing box 91 of conventional design which will match up each code combination of said tumblers transmitted to it by the sensors with a corresponding circuit A to provide coded access to such circuit for whatever function said circuit is designed to perform. It will be understood that the circuits A will be prearranged to correspond to the various code combinations possible with said device 10. Said sensors and circuit board serve as an interface.

Thus there are 9,999 possible circuits, with the arrangement herein to which coded access may be had, running out from the addressing box. This is intended as merely one illustration of means for handling the output of the coded combinations of the tumblers as sensed.

Further, said printed circuit board 89 is merely indicated in being shown secured in spaced relation to the top wall 15 of said housing. Printed circuit boards are well known in the art. A representative circuit 100 from said sensors to said printed circuit board and out therefrom to the addressing box 91 is indicated schematically in FIG. 9. No further description is shown.

Referring to FIG. 8 there are shown the relative positions of the reflective sensors 85 *a–b* and 86 *a–b* in diametrically opposed relation at each side of the tumbler 26 sensing the combinations of the coded spots in alignment therewith. Said coded spots act in effect as binary "on - off" switches as above indicated.

The electrical circuits 100 are a matter of conventional design with the circuits being arranged whereby the corresponding pairs of opposed spots of each tumbler form one digit of the code and upon being sensed become included in a circuit 100 and become matched up with a circuit A by means of said conventional addressing box 91. The structure and operation of an addressing box are well known in the art.

Said circuits A will run to a facility to be operated by said device 10 herein or the device may provide access to a facility, however such operation is not a part of the invention herein. For purpose of some explanation, the device may be related to a complete facility wherein each coded circuit would be in circuit as with a specific computer program to which no one but the code holder would have access. As another example, the operation of the device would permit access to secured quarters. The device is very well suited to provide access to a facility by a large number of persons, each of whom would be identified by the fact that his code identification relates to a specific circuit which would be arranged to record his use of the facility or to give him access to make specific use of a facility. As here presented with the code identification device indicated, the device is capable of receiving 9,999 code identification numbers.

Referring to FIG. 7, a code identifying member 105 is shown in the form of a key. Said key member comprises an elongated barrel 107 extending the length of said housing 12 and at one end portion 108 is a handle formed as a cross member. Given here is merely one illustration of a form of a key.

Said barrel has a slot or groove 110 extending therealong. Said barrel is of a diameter to extend through said keyway 30. The aligned projections 70 - 73 and 74 are received within said groove.

A transverse slot 112 is formed at the end of said barrel adjacent said handle portion 108 to receive therein said projection or pin 74 whereby said key in the present embodiment has a slot of such length as to permit the key to be rotated only through 150°.

Said barrel 107 will be formed to have separated transverse cut out portions 111 - 114 formed therein respectively in alignment with said tumblers 26 - 29. Each of said portions 111 - 114 will comprise a code area and will respectively receive and engage the projections 70 - 73 to rotate said tumblers to have a specific pair of code spots at diametrically opposed edge portions of said tumblers to be aligned with the corresponding reflective sensors 85 and 86 for a certain coded digit to be read or sensed by said sensors.

Figure 12:
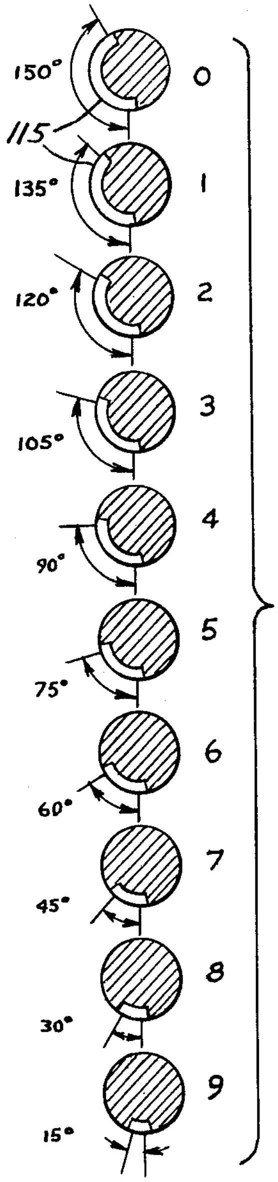
FIG. 12 is a diagrammatic illustration showing cross-sectional views of key configuration which will correspond to the code illustration of FIG. 11.

Referring to FIG. 12, the arcuate extent of each of the cut away or cut out portions as indicated generally by 115 is indicated with its corresponding decimal or numerical value with respect to making up the identifying code formed on a key. The cut away portions are represented as cross-sectional views as they would appear in making up a key. For purpose herein, taking a cross-section of the barrel 107, as indicated in FIG. 7, the barrel will have the cut out portions 111 - 114 therein for positioning by means of the projecting pins 70 - 73, the corresponding tumblers into their desired code identifying positions. It is seen that the diametrically opposed sides of each tumbler are positioned simultaneously.

Each increment of rotative movement of a tumbler of 15° from a zero designation taking into consideration opposed pairs of code spots, represents a numerical value of a digit from 0 to 9. The shaping of the cut out code areas 111 - 114 as shown in FIG. 7 and as indicated in said FIG. 12 shows the binary number 0 as having an arcuate cut out portion of 150° and the binary values from 1 through 9 having corresponding cut out portions successively decreased by increments of 15°. This is an arbitrary arrangement for purpose of illustration and is not intended as a limitation.

For example, to indicate the code identifying number 6957, which is the number for illustration herein and for which the key 105 was coded, in rotating the key in the keyway 30, the cut out portion 111 engages the pin of the tumbler 26 and rotates the tumbler to have the spots on the edge portions thereof representing binary 0 and 1 on one side thereof and the spots representing binary 1 and 0 on the other side thereof aligned with their corresponding sensors which together form the digit 6. The total reflective or white spots are read as binary 1 and the less reflective or dark spots are read as binary 0, in making up the binary coded decimals here used. In like manner with a continued rotation of said key, the tumblers 27 - 29 respectively are positioned for a reading by the sensors of the corresponding code spots thereon in alignment with said sensors to form the digits 957. Thus the total code identifying number 6957 is a code identifying a specific circuit corresponding therewith and the circuit matched therewith becomes energized to do whatever work it has been designed to do. The pin 74 moving in the slot 112 limits the rotational movement of the key to 150° at which point as here designed the desired code spots of each key used will be in position to be read or sensed by the sensors.

Each of the tumblers may be given 10 different positions with respect to the adjacent tumblers and computed in all there are with the use of four tumblers the possible different combinations or code identifications numbering 9,999. The addition of each tumbler increases the number of additional combinations available by a multiple of 10.

Thus the very significant value of the device herein is present in its construction permitting it to accept a large number of coded keys for a secured and coded access to a corresponding and like number of matching electrical circuits.

MODIFICATION

Figure 14:
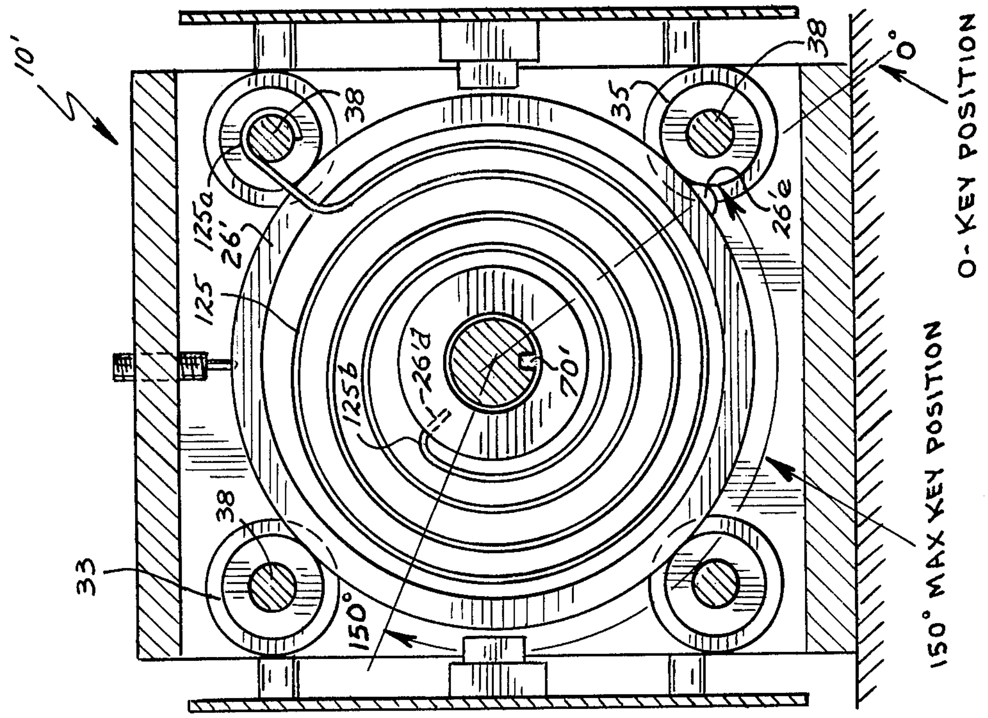
FIG. 14 is a view in vertical cross-section of the modification of FIG. 13.
Figure 13:
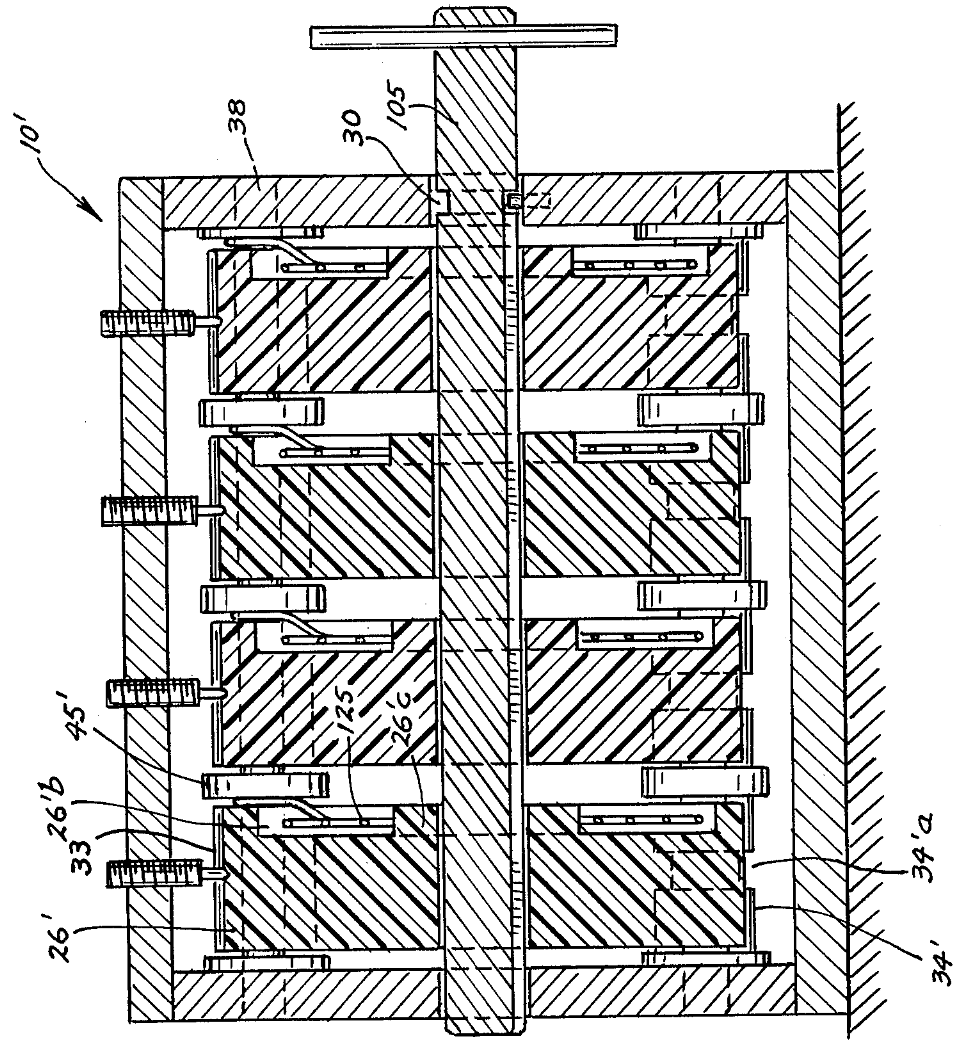
FIG. 13 is a view similar to FIG. 7 showing a modification thereof.

A modification of the structure above described is shown in FIGS. 13 and 14. The structure as a whole as modified is indicated generally by 10' and the parts thereof above described are indicated by like reference numerals and parts modified are indicated by like reference numerals with a prime added.

Only as much of the modified structure is described as is deemed necessary for its understanding.

The modification essentially deals with adding structure to cause each of the tumblers 26 - 29 to be returned or restored to starting position with their respective projections 70 - 73 aligned within the keyway 30 to permit the insertion of a key 105. This prevents the deliberate misalignment of the tumblers by the insertion of an instrument within said keyway.

Referring to FIG. 13, the tumbler 26' is shown having a substantially wide annular groove 26'b formed into one side thereof and formed centrally of said tumbler by said groove is a hub 26'c.

Disposed into said groove 26' is a coil spring 125 having its inner end portion 125b secured in the small transverse slot 26'd formed in said hub 26'c. The outer end 125a of said spring is curved to form to hook portion which is secured about the rod 13 adjacent the spacing member 45'. Said spacing member is somewhat reduced in width as compared with the spacer member 45 above described to provide space to permit said hook portion of said spring to engage said rod 38.

Formed on said roller 26' at the lower portion thereof as shown in FIG. 14 is a projection 26'c forming a stop member and the same is positioned to engage and stop against said roller 35 and to position said tumbler 26' to have the projection 70' in its bore become centered in the keyway 30.

The roller 34' will have a central annular groove 34'a to permit said projection 36'e to pass thereby.

Thus a very simple mechanical addition has been made to the structure of the tumbler 26' to have it automatically restored to its starting position.

The description of the tumbler 26' and the roller 34' and of the spring 125 is representative of like structure with respect to the remaining tumblers and related structure of the modification 10'.

The operation of the invention herein is embodied in the description thereof. The device is well adapted for use where ever it is desired to provide a very simple and effective mechanical code identification for a large number of persons for a matching up of each such identification with and for access to a corresponding electrical circuit.

It will of course be understood that various changes may be made in the form, details, arrangement and proportions of the product without departing from the scope of applicant's invention which, generally stated, consists in a device capable of carrying out the objects above set forth, such as disclosed and defined in the appended claims.

What is claimed is:

1. A mechanical code operated device and code sensing means, having in combination
- a plurality of concentric cylindrical rotatable tumblers having relative rotation,
- means supporting said tumblers,
- said tumblers having aligned bores defining a keyway,
- said tumblers each bearing code indicia on their respective edge portions,
- code indicia sensing means carried by said first mentioned means sensing said code indicia aligned therewith,

- said code indicia comprising reflective spots, some of said spots being more reflective than other of said spots,
- means limiting relative rotation of said tumblers for alignment of said indicia, and
- a code bearing operating means engaging said tumblers rotating the same relative to each other to indicate with said indicia a code corresponding to the code represented by said code bearing operating means, said code indicia being aligned with said code indicia sensing means.

2. The structure set forth in claim 1, wherein
- said code indicia comprises binary code decimals,
- said binary code decimals being represented by said less reflective and more reflective spots,
- each of said tumblers comprises diametrically opposed pairs of said spots,
- said means limiting the rotation of said tumblers not to exceed 180°,
- said code indicia sensing means sensing diametrically opposed pairs of said spots, and
- said diametrically used pairs of said spots of each of said tumblers comprising an element of said code indicia.

3. The structure set forth in claim 1, including
- projections from said tumblers extending into said keyway, and
- said operating means comprising an elongated rod like member,
- transverse slots formed in said member there along representing a code identification engaging the respective projections of said tumblers, and
- each of said slots being arranged to rotate its respective tumbler to provide the code indicia corresponding to the code identification of said operating means.

4. The structure set forth in claim 3, including
- a multiplicity of coded electrical circuits,
- means matching said code indicia sensed with a corresponding of said coded circuits, and
- means transmitting said code indicia sensed to said last mentioned means.

5. The structure set forth in claim 3, including
- a multiplicity of coded electrical circuits,
- said operating means representing a code corresponding to one of said coded circuits, and
- means matching said code indicated by said tumblers to energize a corresponding of said circuits.

6. The structure set forth in claim 3, including
- means in connection with each of said tumblers automatically restoring the same to a position from a misaligned position.

* * * * *